United States Patent
Offeman et al.

(10) Patent No.: US 12,035,015 B2
(45) Date of Patent: Jul. 9, 2024

(54) MULTICAST SYSTEM WITH INTELLIGENT TARGETED SERVING FOR STREAMING CONTENT

(71) Applicant: WIDEORBIT LLC, San Francisco, CA (US)

(72) Inventors: William E. Offeman, Redmond, WA (US); John W. Morris, Washougal, WA (US); Arden G. Adair, Seattle, WA (US); Jean M. Callahan, Hayward, CA (US)

(73) Assignee: WIDEORBIT LLC, San Francisco, CA (US)

( * ) Notice: Subject to any disclaimer, the term of this patent is extended or adjusted under 35 U.S.C. 154(b) by 0 days.

(21) Appl. No.: 17/264,202

(22) PCT Filed: Jul. 31, 2019

(86) PCT No.: PCT/US2019/044514
§ 371 (c)(1),
(2) Date: Jan. 28, 2021

(87) PCT Pub. No.: WO2020/028574
PCT Pub. Date: Feb. 6, 2020

(65) Prior Publication Data
US 2021/0306714 A1  Sep. 30, 2021

Related U.S. Application Data

(60) Provisional application No. 62/714,526, filed on Aug. 3, 2018.

(51) Int. Cl.
*H04N 7/10* (2006.01)
*H04L 65/611* (2022.01)
(Continued)

(52) U.S. Cl.
CPC ....... *H04N 21/6405* (2013.01); *H04L 65/611* (2022.05); *H04N 21/23424* (2013.01);
(Continued)

(58) Field of Classification Search
None
See application file for complete search history.

(56) References Cited

U.S. PATENT DOCUMENTS 9,294,799 B2 * 3/2016 Thomas ............. H04N 21/6587
10,945,048 B2 * 3/2021 Major ................ H04N 21/6582
(Continued)

FOREIGN PATENT DOCUMENTS

KR  20130074253 A  7/2013
KR  20160007915 A  1/2016

*Primary Examiner* — Annan Q Shang
(74) *Attorney, Agent, or Firm* — Seed Intellectual Property Law Group, LLP

(57) ABSTRACT

Systems and methods for providing targeted content in streaming content online that takes into account content, including advertising content, delivered in a corresponding linear broadcast over a defined period of time (e.g., one day, one week). A broadcast content management system is provided that generates a multicast log that corresponds to a broadcast log, and sends the multicast log to a streaming content management system. The streaming content management system utilizes information in the multicast log to select advertisement content to be served to media player systems (e.g., video players).

30 Claims, 6 Drawing Sheets

(51) Int. Cl.
*H04N 21/234* (2011.01)
*H04N 21/258* (2011.01)
*H04N 21/262* (2011.01)
*H04N 21/6405* (2011.01)
*H04N 21/81* (2011.01)

(52) U.S. Cl.
CPC . *H04N 21/25883* (2013.01); *H04N 21/26258* (2013.01); *H04N 21/812* (2013.01)

(56) References Cited

U.S. PATENT DOCUMENTS

| | | | |
|---|---|---|---|
| 2003/0070167 A1* | 4/2003 | Holtz | G06F 16/958 |
| | | | 705/14.69 |
| 2005/0028195 A1* | 2/2005 | Feinleib | H04N 7/163 |
| | | | 725/135 |
| 2005/0074732 A1* | 4/2005 | Morris | G09B 23/32 |
| | | | 434/268 |
| 2005/0204381 A1* | 9/2005 | Ludvig | H04N 21/6125 |
| | | | 725/35 |
| 2006/0287912 A1* | 12/2006 | Raghuvamshi | G06Q 30/02 |
| | | | 705/14.4 |
| 2010/0169910 A1* | 7/2010 | Collins | H04H 60/65 |
| | | | 725/14 |
| 2011/0030002 A1* | 2/2011 | Foti | G06Q 30/02 |
| | | | 705/317 |
| 2013/0191210 A1 | 7/2013 | Moore et al. | |
| 2014/0282652 A1* | 9/2014 | Monnerat | H04H 60/33 |
| | | | 725/32 |
| 2015/0146603 A1* | 5/2015 | Wu | H04L 65/611 |
| | | | 370/312 |
| 2015/0163559 A1* | 6/2015 | Manchester | H04N 21/6582 |
| | | | 725/34 |
| 2015/0334434 A1* | 11/2015 | Green | H04N 21/812 |
| | | | 725/34 |
| 2016/0165319 A1 | 6/2016 | Sun | |
| 2016/0182923 A1* | 6/2016 | Higgs | H04H 20/93 |
| | | | 725/34 |
| 2016/0182977 A1* | 6/2016 | Mitra | H04N 21/8586 |
| | | | 725/34 |
| 2017/0188116 A1* | 6/2017 | Major | H04N 21/47217 |
| 2018/0199115 A1* | 7/2018 | Prasad | H04L 12/1877 |
| 2019/0028777 A1* | 1/2019 | Rao | H04N 21/4383 |
| 2019/0289350 A1* | 9/2019 | Gates | H04M 15/57 |
| 2019/0355051 A1* | 11/2019 | Debusmann | G06Q 30/0201 |

* cited by examiner

```
<?xml version="1.0" encoding="UTF-8"?>
<VAST version="3.0">
  - <Ad id="435622">
    - <InLine>            302
        <AdSystem>WO Streaming</AdSystem>
      - <AdTitle>
          <![CDATA[VideoAdOne]]>
        <AdTitle>
      - <Impression id="WOS Media Impression">
          <![CDATA[http://das.console.wostreaming.net/api/vast/log_impression.php?sta
        </Impression>
      - <Creatives>
        - <Creative adId="435622" sequence="1">
          - <Linear>
```

Multicasts Product – New Multicast Product

| General | Revenue Codes |

- Channel:
- Name:
- Description:
- Sort:
- Inventory Code:

- Start Date: 08/16/18
- Rate Type: Flat Fee
- Allow Goal: ☑

- End Date: 08/16/18  ☐ TFN
- Rate: $0.00
- Floor Rate: $0.00
- Ceiling Rate: ☐ $0.00
- Goal Type: <none>

OK  Cancel

FIG. 4

| Multicast Reconciliation – ST991 | | | | | | |
|---|---|---|---|---|---|---|
| Live-Omi Lines in Date Range (01/30/18–01/30/18) | | | | | | |
| Order # | Line # | Product Description | Inventory Code | Rate | Rate Type | △ Allocated Imps/Plays |
| 61508 | 1 | 991 FM InStream CPM | Su-Sat 24/7 Stream | $3.50 | CPM-Actuals | 1,607 |
| 61508 | 2 | 300x250 Companion Banner | Companion Banner | $3.00 | CPM-Actuals | 1,428 |
| 61508 | 1 | 911 FM InStream CPM | Su-Sat 24/7 Stream | $5.00 | CPM-Actuals | 7,142 |
| 61508 | 2 | 300x250 Companion Banner | Companion Banner | $3.00 | CPM-Actuals | 3,571 |

MULTICAST SYSTEM WITH INTELLIGENT TARGETED SERVING FOR STREAMING CONTENT

BACKGROUND

Technical Field

The present disclosure relates the field of computer technology, and more particularly, to computer systems and methods that provide media content to consumers.

Description of the Related Art

Content providers such as radio stations and networks, television stations and networks, Webcasters, digital publishers, etc., provide programming including content which is the subject of programming. Content providers' delivery of content is often via broadcasts, unicasts, multicasts (collectively, "mediacasts"). While content providers may employ repeaters and the like, broadcasts are typically limited in range to a geographic region.

Programming often includes advertisements interspersed with the subject matter of the programming. The advertisements may occur in segments or slots sometimes referred to as "ad breaks." Content providers typically sell advertising time to generate revenue to fund operation, as well as generate profits, where the content provider is a commercial entity rather than a nonprofit entity. Given that most broadcasts are local in nature or extent, content providers often carry advertisements and other material which is of a somewhat local or parochial interest. For example, a local chain may place advertisements with a local broadcaster since the audience targeted by the local chain is also often local and local advertising tends to be less expensive than regional or national advertising.

New approaches that automate the various activities related to buying, selling and placement of new materials, for instance, advertisements, in content delivery systems are desirable.

BRIEF SUMMARY

A method of providing content to a plurality of consumers may be summarized as including generating, by a broadcast content management system, a multicast log, the multicast log comprising at least a playlist that identifies broadcast content to be broadcast over a defined future time period, the broadcast content comprising program content interspersed with advertisement content; sending, by the broadcast content management system, the generated multicast log to a streaming content management system; causing, by the streaming content management system, one or more multicasts to be provided to one or more video player systems, the one or more multicasts comprising at least some of the broadcast content in the playlist; receiving, by the streaming content management system, a request for advertisement content; selecting, by the streaming content management system, multicast advertisement content based at least in part on the multicast log received from the broadcast content management system; and causing, by the streaming content management system, insertion of the selected multicast advertisement content in the one or more multicasts.

The method may further include sending, by the streaming content management system, multicast advertisement content delivery information for the selected multicast advertisement content to the broadcast content management system.

The method may further include generating, by the broadcast content management system, at least one of an invoice or a report based on the multicast advertisement content delivery information. Generating at least one of an invoice or a report may include generating at least one of an invoice or a report based at least in part on both the multicast advertisement content delivery information and broadcast advertisement content delivery information.

The method may further include generating, by the broadcast content management system, a multicast order based at least in part on the multicast advertisement content delivery information received from the streaming content management system. Receiving a request for multicast advertisement content may include receiving a request for multicast advertisement content that includes at least one of geographic information or demographic information associated with a user of a video player system. Selecting multicast advertisement content may include selecting multicast advertisement content based at least in part on the received geographic information or demographic information associated with the user of the video player system. Selecting multicast advertisement content based at least in part on the multicast log received from the broadcast content management system may include selecting multicast advertisement content based at least in part on broadcast advertisement content identified in the multicast log. Generating a multicast log may include generating a multicast log that identifies broadcast content to be distributed over a day or a week. Generating a multicast log may include generating a multicast log that has the same structure as at least a portion of a corresponding broadcast log generated by the broadcast content management system. Generating a multicast log may include modifying a pre-generated broadcast log for the defined future time period. Generating a multicast log may include generating a multicast log that comprises at least a playlist and, for each of at least some of the broadcast advertisement content, the playlist includes a tracking number associated with the broadcast advertisement content that is provided by a buyer of the broadcast advertisement content. Selecting multicast advertisement content may include selecting multicast advertisement content that is associated with the same tracking number with which corresponding broadcast advertisement content is associated.

The method may further include sending, by the streaming content management system, multicast advertisement content delivery information for the selected multicast advertisement content to the broadcast content management system, wherein the multicast advertisement content delivery information identifies at least some of the multicast advertisement content by the tracking numbers provided by a buyer of the broadcast advertisement content. The method may further include receiving, by the streaming content management system, multicast advertisement content delivery information; aggregating, by the streaming content management system, the received multicast advertisement content delivery information; and sending, by the streaming content management system, the aggregate multicast advertisement content delivery information to the broadcast content management system. Receiving multicast advertisement delivery content delivery information may include receiving, by the streaming content management system, impression data from a video player system.

A method to provide content to a plurality of consumers may be summarized as including receiving, by a streaming content management system, a multicast log from a broadcast content management system, the multicast log comprising at least a playlist that identifies broadcast content to be broadcast over a defined future time period, the broadcast content comprising program content interspersed with advertisement content; causing, by the streaming content management system, one or more multicasts to be provided to one or more video player systems, the one or more multicasts comprising at least some of the broadcast content in the playlist; receiving, by the streaming content management system, a request for advertisement content; selecting, by the streaming content management system, multicast advertisement content based at least in part on the multicast log received from the broadcast content management system; and causing, by the streaming content management system, insertion of the selected multicast advertisement content in the one or more multicasts.

A method of providing content to a plurality of consumers may be summarized as including generating, by a broadcast content management system, a multicast log, the multicast log comprising at least a playlist that identifies broadcast content to be broadcast over a defined future time period, the broadcast content comprising program content interspersed with advertisement content; and sending, by the broadcast content management system, the generated multicast log to a streaming content management system, wherein the streaming content management system selects multicast advertisement content based at least in part on the multicast log and causes insertion of the selected multicast advertisement content in one or more multicasts.

A system to provide content to a plurality of consumers may be summarized as including at least one nontransitory processor-readable storage medium that stores at least one of processor-executable instructions or data; and at least one processor communicatively coupled to the at least one nontransitory processor-readable storage medium, in operation, the at least one processor: receives a multicast log from a broadcast content management system, the multicast log comprising at least a playlist that identifies broadcast content to be broadcast over a defined future time period, the broadcast content comprising program content interspersed with advertisement content; causes one or more multicasts to be provided to one or more video player systems, the one or more multicasts comprising at least some of the broadcast content in the playlist; receives a request for advertisement content; selects multicast advertisement content based at least in part on the multicast log received from the broadcast content management system; and causes insertion of the selected multicast advertisement content in the one or more multicasts.

A system to provide content to a plurality of consumers may be summarized as including a broadcast content management system (BCMS) that comprises at least one BCMS nontransitory processor-readable storage medium that stores at least one of processor-executable instructions or data, and at least one BCMS processor communicatively coupled to the at least one BCMS nontransitory processor-readable storage medium, in operation, the at least one BCMS processor: generates a multicast log, the multicast log comprising at least a playlist that identifies broadcast content to be broadcast over a defined future time period, the broadcast content comprising program content interspersed with advertisement content; and sends the generated multicast log to a streaming content management system; and a streaming content management system (SCMS) that comprises at least one SCMS nontransitory processor-readable storage medium that stores at least one of processor-executable instructions or data, and at least one SCMS processor communicatively coupled to the at least one SCMS nontransitory processor-readable storage medium, in operation, the at least one SCMS processor: causes one or more multicasts to be provided to one or more video player systems, the one or more multicasts comprising at least some of the broadcast content in the playlist; receives a request for advertisement content; selects multicast advertisement content based at least in part on the multicast log received from the broadcast content management system; and causes insertion of the selected multicast advertisement content in the one or more multicasts.

The at least one SCMS processor may send multicast advertisement content delivery information for the selected multicast advertisement content to the broadcast content management system. The at least one BCMS processor may generate at least one of an invoice or a report based on the multicast advertisement content delivery information. The at least one BCMS processor may generate at least one of an invoice or a report based at least in part on both the multicast advertisement content delivery information and broadcast advertisement content delivery information. The at least one BCMS processor may generate a multicast order based at least in part on the multicast advertisement content delivery information received from the streaming content management system. The at least one SCMS processor may receive a request for multicast advertisement content that includes at least one of geographic information or demographic information associated with a user of a video player system. The at least one SCMS processor may select multicast advertisement content based at least in part on the received geographic information or demographic information associated with the user of the video player system. The at least one SCMS processor may select multicast advertisement content based at least in part on broadcast advertisement content identified in the multicast log. The at least one BCMS processor may generate a multicast log that identifies broadcast content to be distributed over a day or a week. The at least one BCMS processor may generate a multicast log that has the same structure as at least a portion of a corresponding broadcast log generated by the broadcast content management system.

To generate a multicast log, the at least one BCMS processor may modify a pre-generated broadcast log for the defined future time period. To generate a multicast log, the at least one BCMS processor may generate a multicast log that comprises at least a playlist and, for each of at least some of the broadcast advertisement content, the playlist includes a tracking number associated with the broadcast advertisement content that is provided by a buyer of the broadcast advertisement content.

To select multicast advertisement content, the at least one SCMS processor may select multicast advertisement content that is associated with the same tracking number with which corresponding broadcast advertisement content is associated. The at least one SCMS processor may send multicast advertisement content delivery information for the selected multicast advertisement content to the broadcast content management system, wherein the multicast advertisement content delivery information identifies at least some of the multicast advertisement content by the tracking numbers provided by a buyer of the broadcast advertisement content. The SCMS processor may receive multicast advertisement content delivery information; aggregate the received multicast advertisement content delivery information; and send the aggregate multicast advertisement content delivery information to the broadcast content management system.

The received multicast advertisement content delivery information may include impression data received from a video player system.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

FIG. 3 is a code snippet that shows per-user impression recordation when a video service confirms insertion via a VAST impression ad tag, according to one non-limiting illustrated implementation.

FIG. 4 is a screenshot of a user interface of a broadcast content management system that allows for creation of a multicast product, according to one non-limiting illustrated implementation.

FIG. 5 is a screenshot of a user interface of a broadcast content management system that shows reconciliation for a multicast order, according to one non-limiting illustrated implementation.

DETAILED DESCRIPTION

Figure 1:
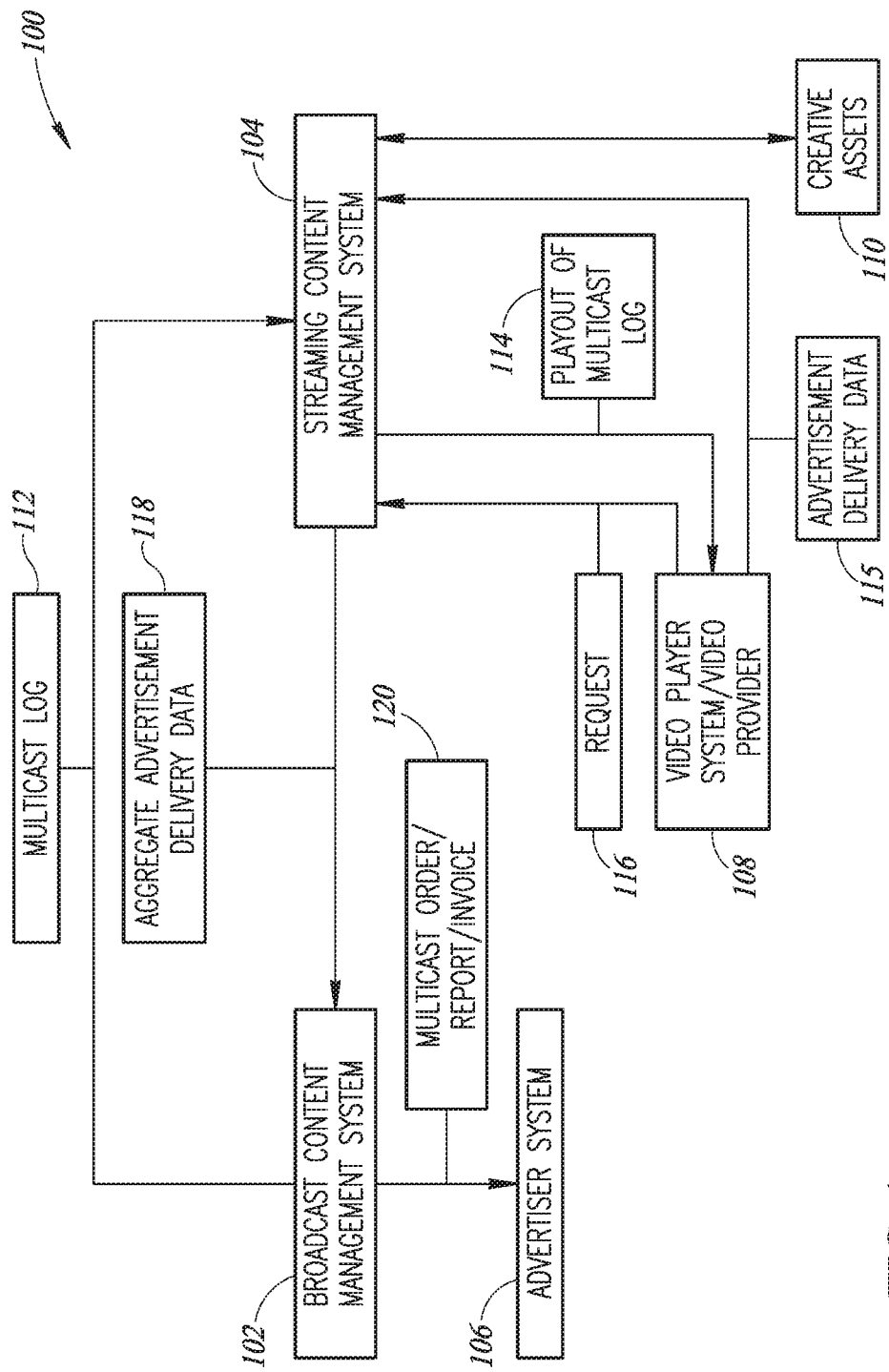
FIG. 1 is a schematic diagram of a networked environment, including a broadcast content management system and a streaming content management system, according to one non-limiting illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure are directed to computer-implemented systems and methods of providing targeted advertisement content in streaming content online that takes into account content, including advertising content, delivered in a corresponding linear broadcast over a defined period of time (e.g., one day, one week). A broadcast content management system is provided that generates a multicast log that corresponds to a broadcast log. The broadcast content management system sends the multicast log to a streaming content management system, which advantageously provides the streaming content management system with knowledge of the content previously or concurrently delivered by the broadcast content management system. The streaming content management system utilizes information in the multicast log and possibly other information (e.g., geographic data, demographic data, device metadata) to select advertisement content to be served to media player systems (e.g., video players). The streaming content management system provides advertisement delivery data back to the broadcast content management system, which may utilize such data to generate one or more orders, reports, and/or invoices. In at least some implementations, the streaming content management system receives advertisement delivery data (e.g., viewable impressions data) from video player systems, aggregates the received data, and sends the aggregate data to the broadcast content management system. Non-limiting examples of a broadcast content management system and a streaming content management system are WO Traffic and WO Streaming, respectively, offered by WideOrbit, Inc.

FIG. 1 shows a networked environment 100 according to one illustrated implementation in which various apparatus, methods and articles described herein may operate. In this example, the environment 100 includes a broadcast content management system 102, a streaming content management system 104, an advertiser system 106, a video or other media player system or video provider 108, and a creative assets source or system 110 that provides creative assets to the streaming content management system 104. The various components in the environment 100 may be communicatively coupled by one or more networks (e.g., Internet) or other communications channels.

Figure 2:
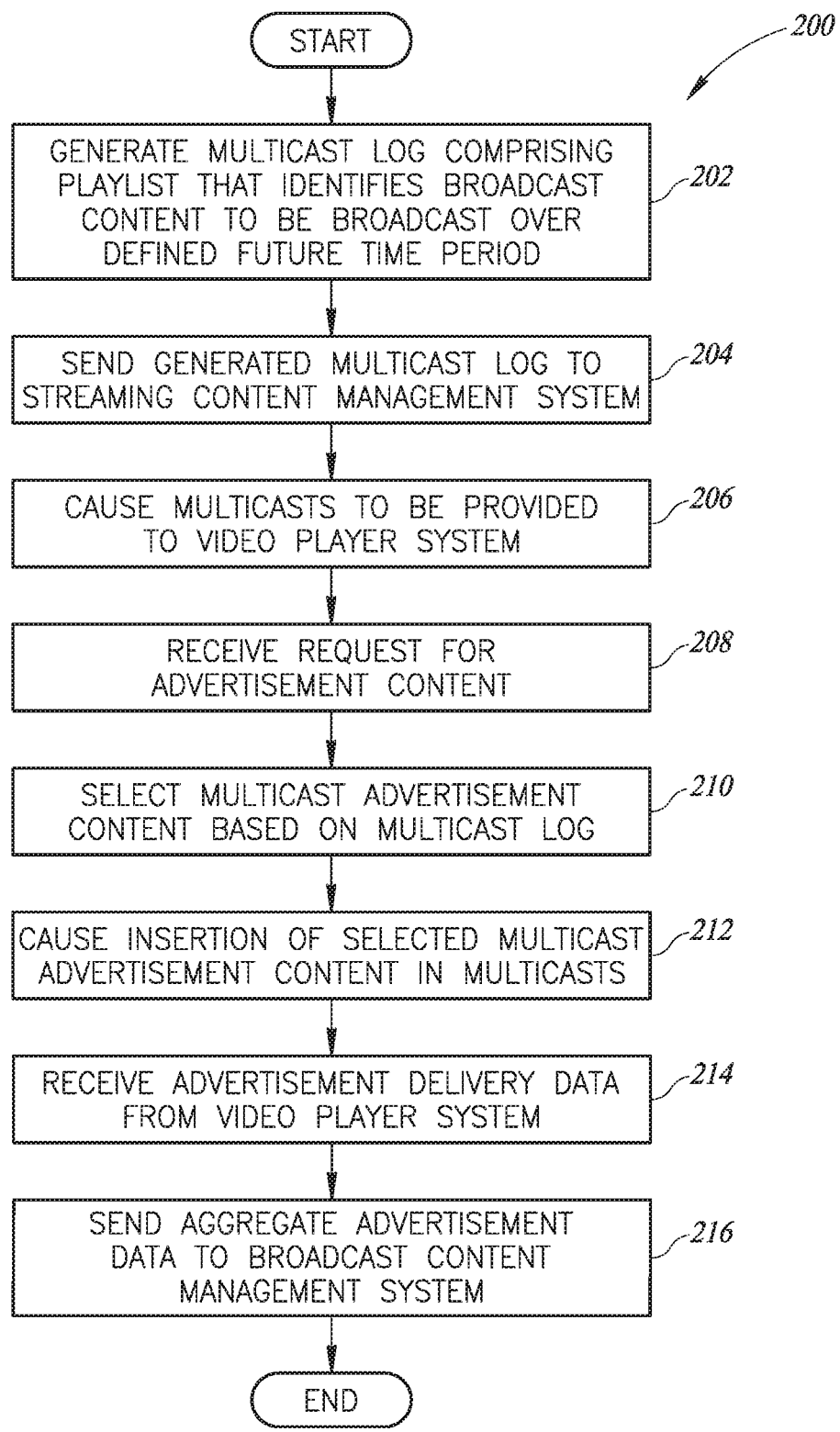
FIG. 2 is a flow diagram that depicts a method of operating a broadcast content management system and a streaming content management system, according to one non-limiting illustrated implementation.

FIG. 2 depicts a method 200 of operating the broadcast content management system 102 and the streaming content management system 104 to provide targeted content (e.g., advertising content) to users. In at least some implementations, the broadcast content management system 102 may provide various aspects of billing, reconciliation, and creative execution. In some implementations, the broadcast content management system 102 may include or communicate with advertisement management software and/or sales and traffic management systems. The streaming content management system 104 may include or communicate with functionality to stream content (e.g., video, audio) to video player systems 108, and/or may include or communicate with functionality (e.g., ad server) to serve targeted advertisements to the users of the video player systems 108. In at least some implementations, the systems 102 and 104 may together provide advertisement decisioning across various devices, environments and data sets, and may also provide a unified solution that functions across devices to re-aggregate audience information and to validate cross-screen inventory. The systems 102 and 104 may facilitate planning and packaging of inventory to reach audiences at scale while maximizing revenue and meeting business goals.

The method 200 begins at 202, wherein the broadcast content management system 102 generates a multicast log 112 (FIG. 1) that includes at least a playlist. The playlist may identify a schedule of broadcast content to be broadcast over a channel by the broadcast content management system 102 over a defined future time period, such as a day or a week. The broadcast content may include program content (e.g., sports, movies, sitcoms) interspersed with advertisement content.

In at least some implementations, the multicast log 112 may have the same structure as at least a portion of a corresponding broadcast log generated by the broadcast content management system 102. For example, in at least some implementations, the multicast log 112 may be generated by modifying a pre-generated broadcast log for the defined future time period. As discussed further below, in at least some implementations, for each of at least some of the broadcast advertisement content, the playlist of the multicast log 112 may include a tracking number (e.g., "Ad ID") associated with the broadcast advertisement content that is provided by a buyer of the broadcast advertisement content, e.g., via the advertiser system 106 (FIG. 1) communicatively coupled to the broadcast content management system 102.

At 204, the broadcast content management system 102 may push or otherwise send the generated multicast log 112 to the streaming content management system 104. As discussed further below, this allows the streaming content management system 104 to be aware of what content has been delivered by the broadcast content management system 102 (the "linear side"), which allows the streaming content management system 104 to provide improved delivery of advertisement content that takes into account this knowledge of the content delivered by the broadcast content management system 102. Once the streaming content management system 104 has received the playlist, the streaming content management system may retrieve creative assets from one or more creative asset sources 110 (e.g., sources associated with one or more advertisers).

At 206, the streaming content management system 104 may cause playout 114 of the multicast log 112 on the one or more video player systems 108.

At 208, the streaming content management system 104 may receive a request for advertisement content. For example, the streaming content management system 104 may receive a VAST request for advertisement content. The request for multicast advertisement content may include one or more of geographic information, demographic information, video player system information, user preferences information, or other metadata associated with a user of a video player system. Depending on the service that is delivering the actual content, the request may come from the video player system 108 directly to the streaming content management system 104, or there may be a request from a video provider wherein a streaming server of the video provider generates a request to the streaming content management system 104.

At 210, the streaming content management system may select multicast advertisement content based at least in part on the multicast log 112 received from the broadcast content management system 104. In at least some implementations, the streaming content management system 104 may additionally or alternatively select multicast advertisement content based at least in part on other metadata, such as geographic information, demographic information, device information, etc., associated with the user of the video player system 108. The streaming content management system 104 may select multicast advertisement content based at least in part on broadcast advertisement content and/or broadcast program content identified in the multicast log 112. The streaming content management system 104 may in some implementations select multicast advertisement content that is associated with the same tracking number (e.g., "Ad ID") with which corresponding broadcast advertisement content is associated.

For a particular consumer (e.g., viewer, listener), the streaming content management system 104 may know certain attributes, such as the type of device they are using, their location, what time of day, day of week, etc. The streaming content management system 104 may compare those features to orders, and may apply decision optimizations and smoothing algorithms to decide which advertisement to serve. By taking into account the multicast log 112, the streaming content management system 104 may be able to more intelligently decide which advertisement to serve. For example, the streaming content management system 104 has knowledge of the type of content (e.g., sports, news, romantic comedy), as well as the particular advertisements that were run on the broadcast side.

At 212, the streaming content management system 104 may cause insertion of the selected multicast advertisement content in the one or more multicasts.

At 214, the streaming content management system 104 may receive advertisement delivery data 115 from the video player system 108 to which the advertisement content was delivered. For example, the advertisement delivery data received from the video player system 108 may include viewable impressions data gathered by the video system that indicates that the content was viewed by the user. In at least some implementations, the viewable impressions tracking data may identify and account for various user behaviors which prevent ad viewing, such as ad-blocking software, user scrolling before the advertisement content has loaded, broken or incompatible software or hardware components, minimized windows, etc.

At 216, the streaming content management system 104 may aggregate the received advertisement delivery data 115 and send aggregate multicast advertisement content delivery information 118 (FIG. 1), also referred to herein as aggregate advertisement delivery data, to the broadcast content management system 102. As an example, the multicast advertisement content delivery information 118 may include information relating to impressions, demographics, device information, etc., for advertisement content provided to the video player systems 108.

In at least some implementations, the broadcast content management system 102 may generate a multicast order, an invoice, or a report 120 based on the multicast advertisement content delivery information 118 received from the streaming content management system 104. The order, invoice, or report 120 may be based on both the multicast advertisement content delivery information 118 and broadcast advertisement content delivery information collected by the broadcast content management system 102, thereby providing advertisers with information for linear and multicast delivery in a unified format. In at least some implementations, the broadcast content management system 102 may generate a multicast order 120 based at least in part on the multicast advertisement content delivery information 118 received from the streaming content management system 104. Once generated, the broadcast content management system 102 may send the order, invoice, or report 120 to the advertiser system 106 associated with one or more advertisers.

As noted above, in at least some implementations, the streaming content management system 104 may send multicast advertisement content delivery information 118 for the selected multicast advertisement content to the broadcast content management system 102, wherein the multicast advertisement content delivery information 118 identifies at least some of the multicast advertisement content by the tracking numbers provided by a buyer (e.g., advertiser) of the broadcast advertisement content. Thus, the systems 102 and 104 and the advertisers are able to track advertisement content across multiple platforms using the same tracking number.

The broadcast content management system 102 may provide a user interface that allows for selection of a playlist having a multicast property type. In at least some implementations, the multicast property type is copied from the airtime or broadcast property type, and may include a similar or identical inventory tree/inventory code structure as the airtime property. The system 102 may allow the user to mass copy formats from the airtime property to the multicast property. In at least some implementations, the user may be able to manually change materials if desired. As noted above, once the multicast log has been finalized, the playlist is generated and sent to the streaming content management system 104.

FIG. 3 is a code snippet 300 that shows per-user impression recordation when a video service or player confirms insertion via a VAST impression ad tag 302. As discussed above, impressions may be aggregated per individual placement within the playlist and are sent to the broadcast content management system 102 via an "as-run" report.

FIG. 4 is a screenshot 400 of a user interface that allows for creation of a multicast product. The system 102 may also provide a user interface that allows for creation of a multicast order based off of a digital order.

Figure 5:
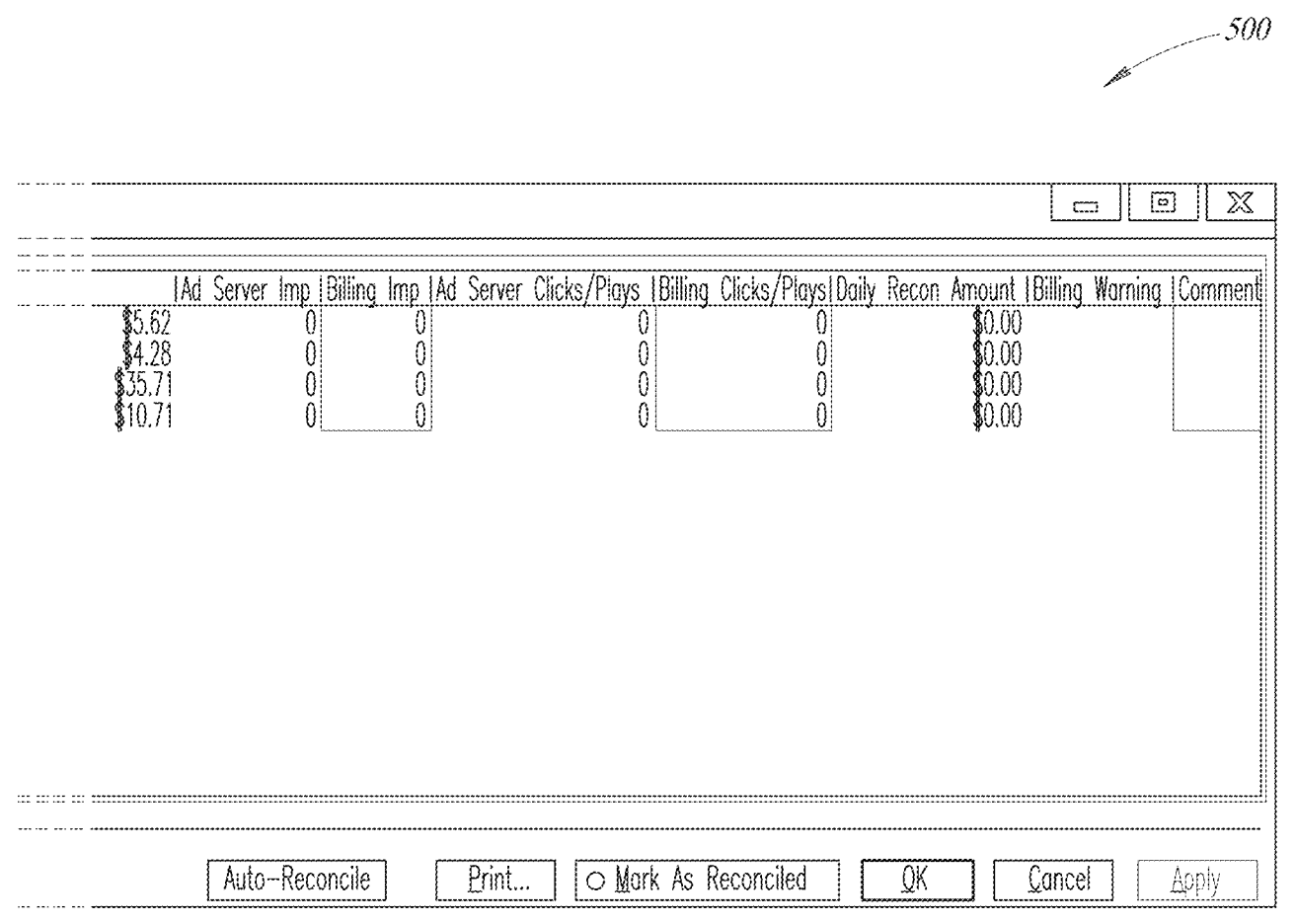

In at least some implementations, the system 102 may provide a user interface that shows a linear schedule that may be implemented by the broadcast content management system. FIG. 5 is a screenshot 500 of a user interface that shows a reconciliation report for a multicast order. The system 102 may generate a multicast billing file that is based off a digital billing file, for example. The system 102 may provide an automatic reconciliation of the advertisements using the "as run" report.

In at least some implementations, the system 102 may generate consolidated invoices that include one or more digital orders (e.g., multicast, streaming) and one or more linear (e.g., broadcast) orders. Thus, advertisers are able to review and manage invoicing across multiple platforms using a single, unified format.

In at least some implementations, the functionality provided herein may be coupled with existing technology to provide advertisement serving functionality, while allowing other systems to continue to operate normally, such as content delivery networks (CDNs), media players, encode farms, etc. Thus, the functionality described herein may "plug in" to existing systems to serve as an advertisement server for such systems.

Figure 6:
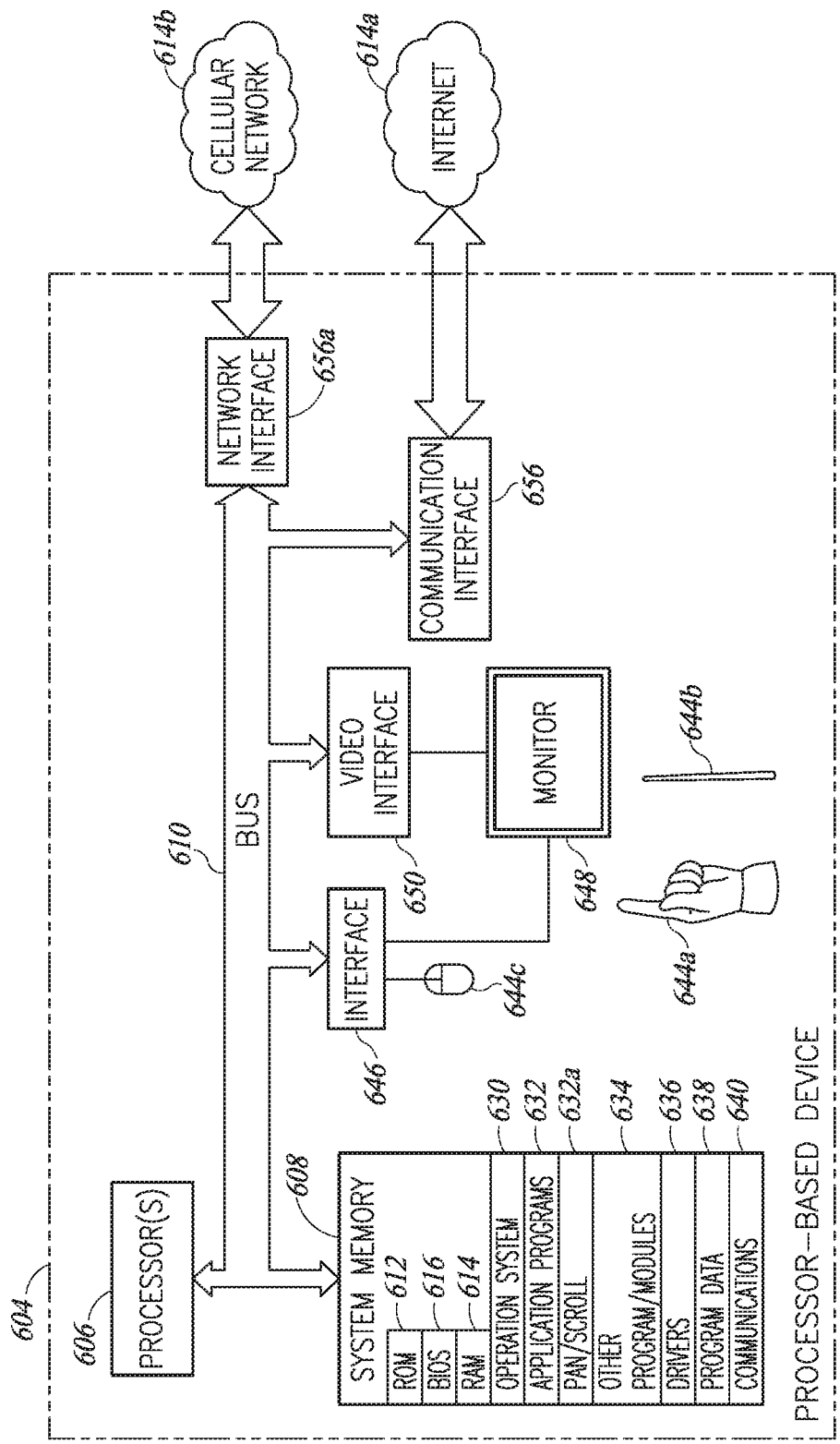
FIG. 6 is a schematic diagram of an example computing environment in which one or more systems and methods of the present disclosure may be implemented, according to one non-limiting illustrated implementation.

FIG. 6 shows a processor-based device 604 suitable for implementing the various functionality described herein. Although not required, some portion of the implementations will be described in the general context of processor-executable instructions or logic, such as program application modules, objects, or macros being executed by one or more processors. Those skilled in the relevant art will appreciate that the described implementations, as well as other implementations, can be practiced with various processor-based system configurations, including handheld devices, such as smartphones and tablet computers, wearable devices, multiprocessor systems, microprocessor-based or programmable consumer electronics, personal computers ("PCs"), network PCs, minicomputers, mainframe computers, and the like.

The processor-based device 604 may include one or more processors 606, a system memory 608 and a system bus 610 that couples various system components including the system memory 608 to the processor(s) 606. The processor-based device 604 will at times be referred to in the singular herein, but this is not intended to limit the implementations to a single system, since in certain implementations, there will be more than one system or other networked computing device involved. Non-limiting examples of commercially available systems include, but are not limited to, ARM processors from a variety of manufactures, Core microprocessors from Intel Corporation, U.S.A., PowerPC microprocessor from IBM, Sparc microprocessors from Sun Microsystems, Inc., PA-RISC series microprocessors from Hewlett-Packard Company, 68xxx series microprocessors from Motorola Corporation.

The processor(s) 606 may be any logic processing unit, such as one or more central processing units (CPUs), microprocessors, digital signal processors (DSPs), application-specific integrated circuits (ASICs), field programmable gate arrays (FPGAs), etc. Unless described otherwise, the construction and operation of the various blocks shown in FIG. 6 are of conventional design. As a result, such blocks need not be described in further detail herein, as they will be understood by those skilled in the relevant art.

The system bus 610 can employ any known bus structures or architectures, including a memory bus with memory controller, a peripheral bus, and a local bus. The system memory 608 includes read-only memory ("ROM") 612 and random access memory ("RAM") 614. A basic input/output system ("BIOS") 616, which can form part of the ROM 612, contains basic routines that help transfer information between elements within processor-based device 604, such as during start-up. Some implementations may employ separate buses for data, instructions and power.

The processor-based device 604 may also include one or more solid state memories, for instance Flash memory or solid state drive (SSD) 618, which provides nonvolatile storage of computer-readable instructions, data structures, program modules and other data for the processor-based device 604. Although not depicted, the processor-based device 604 can employ other nontransitory computer- or processor-readable media, for example a hard disk drive, an optical disk drive, or memory card media drive.

Program modules can be stored in the system memory 608, such as an operating system 630, one or more application programs 632, other programs or modules 634, drivers 636 and program data 638.

The application programs 632 may, for example, include panning/scrolling 632a. Such panning/scrolling logic may include, but is not limited to logic that determines when and/or where a pointer (e.g., finger, stylus, cursor) enters a user interface element that includes a region having a central portion and at least one margin. Such panning/scrolling logic may include, but is not limited to logic that determines a direction and a rate at which at least one element of the user interface element should appear to move, and causes updating of a display to cause the at least one element to appear to move in the determined direction at the determined rate. The panning/scrolling logic 632a may, for example, be stored as one or more executable instructions. The panning/scrolling logic 632a may include processor and/or machine executable logic or instructions to generate user interface objects using data that characterizes movement of a pointer, for example data from a touch-sensitive display or from a computer mouse or trackball, or other user interface device.

The system memory 608 may also include communications programs 640, for example a server and/or a Web client or browser for permitting the processor-based device 604 to access and exchange data with other systems such as user computing systems, Web sites on the Internet, corporate intranets, or other networks as described below. The communications programs 640 in the depicted implementation is markup language based, such as Hypertext Markup Language (HTML), Extensible Markup Language (XML) or Wireless Markup Language (WML), and operates with markup languages that use syntactically delimited characters added to the data of a document to represent the structure of the document. A number of servers and/or Web clients or browsers are commercially available such as those from Mozilla Corporation of California and Microsoft of Washington.

While shown in FIG. 6 as being stored in the system memory 608, the operating system 630, application programs 632, other programs/modules 634, drivers 636, program data 638 and server and/or browser 640 can be stored on any other of a large variety of nontransitory processor-readable media (e.g., hard disk drive, optical disk drive, SSD and/or flash memory).

A user can enter commands and information via a pointer, for example through input devices such as a touch screen 648 via a finger 644a, stylus 644b, or via a computer mouse or trackball 644c which controls a cursor. Other input devices can include a microphone, joystick, game pad, tablet, scanner, biometric scanning device, etc. These and other input devices (i.e., "I/O devices") are connected to the processor(s) 606 through an interface 646 such as touch-screen controller and/or a universal serial bus ("USB") interface that couples user input to the system bus 610, although other interfaces such as a parallel port, a game port or a wireless interface or a serial port may be used. The touch screen 648 can be coupled to the system bus 610 via a video interface 650, such as a video adapter to receive image data or image information for display via the touch screen 648. Although not shown, the processor-based device 604 can include other output devices, such as speakers, vibrator, haptic actuator, etc.

The processor-based device 604 may operate in a networked environment using one or more of the logical connections to communicate with one or more remote computers, servers and/or devices via one or more communications channels, for example, one or more networks 614a, 614b. These logical connections may facilitate any known method of permitting computers to communicate, such as through one or more LANs and/or WANs, such as the Internet, and/or cellular communications networks. Such networking environments are well known in wired and wireless enterprise-wide computer networks, intranets, extranets, the Internet, and other types of communication networks including telecommunications networks, cellular networks, paging networks, and other mobile networks.

When used in a networking environment, the processor-based device 604 may include one or more wired or wireless communications interfaces 614a, 614b (e.g., cellular radios, WI-FI radios, Bluetooth radios) for establishing communications over the network, for instance the Internet 614a or cellular network.

In a networked environment, program modules, application programs, or data, or portions thereof, can be stored in a server computing system (not shown). Those skilled in the relevant art will recognize that the network connections shown in FIG. 6 are only some examples of ways of establishing communications between computers, and other connections may be used, including wirelessly.

For convenience, the processor(s) 606, system memory 608, network and communications interfaces 614a, 614b are illustrated as communicably coupled to each other via the system bus 610, thereby providing connectivity between the above-described components. In alternative implementations of the processor-based device 604, the above-described components may be communicably coupled in a different manner than illustrated in FIG. 6. For example, one or more of the above-described components may be directly coupled to other components, or may be coupled to each other, via intermediary components (not shown). In some implementations, system bus 610 is omitted and the components are coupled directly to each other using suitable connections.

Advantageously, by decisioning at least in part using information such as audience demographic and geography, or including real-time programmatic ad sources, the streaming services of the present disclosure are advantageously able to optimize yield (e.g., advertising revenue) for the seller (e.g., broadcaster) and to optimize advertisement relevancy for the audience.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

This application claims the benefit of priority to U.S. Provisional Application No. 62/714,526, filed Aug. 3, 2018, which application is hereby incorporated by reference in its entirety.

The invention claimed is:

1. A method of providing content to a plurality of consumers, the method comprising:
generating, by a broadcast content management system, a multicast log, the multicast log comprising at least a playlist that identifies broadcast content to be broadcast over a defined future time period, the broadcast content comprising program content interspersed with advertisement content, and the multicast log having a tracking number associated with the broadcast advertisement content that is provided by a buyer of the broadcast advertisement content;
sending, by the broadcast content management system, the generated multicast log to a streaming content management system;
causing, by the streaming content management system, one or more multicasts to be provided to one or more video player systems, the one or more multicasts comprising at least some of the broadcast content in the playlist, the one or more multicasts being provided concurrently with a broadcast;
receiving, by the streaming content management system, a request for advertisement content, the request for advertisement content including user-specific metadata that is associated with a user of a video player system;
responsive to receiving the request for advertisement content, selecting, by the streaming content management system, multicast advertisement content associated with at least one buyer, wherein the selecting of the multicast advertisement content is based on both (a) the received user-specific metadata and (b) broadcast advertisement content identified in the multicast log received from the broadcast content management system, the multicast advertisement content is associated with the same tracking number as corresponding broadcast advertisement content associated with the at least one buyer; and
causing, by the streaming content management system, insertion of the selected multicast advertisement content in the one or more multicasts, such that the selected multicast advertisement content is displayed on first one or more viewer devices concurrently with broadcast advertisement content being displayed on second one or more other devices.

2. The method of claim 1, further comprising:
sending, by the streaming content management system, multicast advertisement content delivery information for the selected multicast advertisement content to the broadcast content management system.

3. The method of claim 2, further comprising:
generating, by the broadcast content management system, at least one of an invoice or a report based on the multicast advertisement content delivery information.

4. The method of claim 3 wherein generating at least one of an invoice or a report comprises generating at least one of an invoice or a report based at least in part on both the multicast advertisement content delivery information and broadcast advertisement content delivery information.

5. The method of claim 2, further comprising:
generating, by the broadcast content management system, a multicast order based at least in part on the multicast advertisement content delivery information received from the streaming content management system.

6. The method of claim 1 wherein receiving a request for multicast advertisement content comprises receiving a request for multicast advertisement content that includes at least one of geographic information or demographic information associated with a user of a video player system.

7. The method of claim 6 wherein selecting multicast advertisement content comprises selecting multicast advertisement content based at least in part on the received geographic information or demographic information associated with the user of the video player system.

8. The method of claim 1 wherein generating a multicast log comprises generating a multicast log that identifies broadcast content to be distributed over a day or a week.

9. The method of claim 1 wherein generating a multicast log comprises generating a multicast log that has the same structure as at least a portion of a corresponding broadcast log generated by the broadcast content management system.

10. The method of claim 1 wherein generating a multicast log comprises modifying a pre-generated broadcast log for the defined future time period.

11. The method of claim 1 wherein the broadcast content management system tracks advertisement content across multiple platforms using the same tracking number.

12. The method of claim 1, further comprising:
sending, by the streaming content management system, multicast advertisement content delivery information for the selected multicast advertisement content to the broadcast content management system, wherein the multicast advertisement content delivery information identifies at least some of the multicast advertisement content by the tracking number provided by the buyer of the broadcast advertisement content.

13. The method of claim 1, further comprising:
receiving, by the streaming content management system, multicast advertisement content delivery information;
aggregating, by the streaming content management system, the received multicast advertisement content delivery information; and
sending, by the streaming content management system, the aggregate multicast advertisement content delivery information to the broadcast content management system.

14. The method of claim 13 wherein receiving multicast advertisement delivery content delivery information comprises receiving, by the streaming content management system, impression data from a video player system.

15. A system to provide content to a plurality of consumers, the system comprising:

a broadcast content management system (BCMS) that comprises at least one BCMS nontransitory processor-readable storage medium that stores at least one of processor-executable instructions or data, and at least one BCMS processor communicatively coupled to the at least one BCMS nontransitory processor-readable storage medium, in operation, the at least one BCMS processor:

generates a multicast log, the multicast log comprising at least a playlist that identifies broadcast content to be broadcast over a defined future time period, the broadcast content comprising program content interspersed with advertisement content, and the multicast log having a tracking number associated with the broadcast advertisement content that is provided by a buyer of the broadcast advertisement content; and sends the generated multicast log to a streaming content management system; and a streaming content management system (SCMS) that comprises at least one SCMS nontransitory processor-readable storage medium that stores at least one of processor-executable instructions or data, and at least one SCMS processor communicatively coupled to the at least one SCMS nontransitory processor-readable storage medium, in operation, the at least one SCMS processor:

causes one or more multicasts to be provided to one or more video player systems, the one or more multicasts comprising at least some of the broadcast content in the playlist and the one or more multicasts being provided concurrently with a broadcast;

receives a request for advertisement content, the request for advertisement content including user-specific metadata that is associated with a user of a video player system;

responsive to receiving the request for advertisement content, selects multicast advertisement content associated with at least one buyer, wherein the selecting of the multicast advertisement content is based on both (a) the received user-specific metadata and (b) broadcast advertisement content identified in the multicast log received from the broadcast content management system, the multicast advertisement content is associated with the same tracking number as corresponding broadcast advertisement content associated with the at least one buyer; and causes insertion of the selected multicast advertisement content in the one or more multicasts, such that the selected multicast advertisement content is displayed on first one or more viewer devices concurrently with broadcast advertisement content being displayed on second one or more other devices.

16. The system of claim 15 wherein the at least one SCMS processor:

sends multicast advertisement content delivery information for the selected multicast advertisement content to the broadcast content management system.

17. The system of claim 16 wherein the at least one BCMS processor:

generates a multicast order based at least in part on the multicast advertisement content delivery information received from the streaming content management system.

18. The system of claim 16 wherein the at least one BCMS processor:

generates at least one of an invoice or a report based on the multicast advertisement content delivery information.

19. The system of claim 18 wherein the at least one BCMS processor generates at least one of an invoice or a report based at least in part on both the multicast advertisement content delivery information and broadcast advertisement content delivery information.

20. The system of claim 15 wherein the at least one SCMS processor:

receives a request for multicast advertisement content that includes at least one of geographic information or demographic information associated with a user of a video player system.

21. The system of claim 20 wherein the at least one SCMS processor:

selects multicast advertisement content based at least in part on the received geographic information or demographic information associated with the user of the video player system.

22. The system of claim 15 wherein the at least one BCMS processor:

generates a multicast log that identifies broadcast content to be distributed over a day or a week.

23. The system of claim 15 wherein the at least one BCMS processor:

generates a multicast log that has the same structure as at least a portion of a corresponding broadcast log generated by the broadcast content management system.

24. The system of claim 15 wherein, to generate a multicast log, the at least one BCMS processor:

modifies a pre-generated broadcast log for the defined future time period.

25. The system of claim 15 wherein the at least one BCMS processor tracks advertisement content across multiple platforms using the same tracking number.

26. The system of claim 15 wherein the at least one SCMS processor:

sends multicast advertisement content delivery information for the selected multicast advertisement content to the broadcast content management system, wherein the multicast advertisement content delivery information identifies at least some of the multicast advertisement content by the tracking number provided by the buyer of the broadcast advertisement content.

27. The system of claim 15 wherein the SCMS processor:
receives multicast advertisement content delivery information;
aggregates the received multicast advertisement content delivery information; and
sends the aggregate multicast advertisement content delivery information to the broadcast content management system.

28. The system of claim 27 wherein the received multicast advertisement content delivery information comprises impression data received from a video player system.

29. A method of providing content to a plurality of consumers, the method comprising:

generating, by a broadcast content management system, a multicast log, the multicast log comprising at least a playlist that identifies broadcast content to be broadcast over a defined future time period, the broadcast content comprising program content interspersed with advertisement content, wherein, for each of at least some of the broadcast advertisement content, the playlist includes a tracking number associated with the broadcast advertisement content that is provided by a buyer of the broadcast advertisement content;

sending, by the broadcast content management system, the generated multicast log to a streaming content management system;

causing, by the streaming content management system, one or more multicasts to be provided to one or more video player systems, the one or more multicasts comprising at least some of the broadcast content in the playlist, the one or more multicasts being provided concurrently with a broadcast;

receiving, by the streaming content management system, a request for advertisement content, the request for advertisement content including user-specific metadata that is associated with a user of a video player system;

responsive to receiving the request for advertisement content, selecting, by the streaming content management system, multicast advertisement content associated with at least one buyer, wherein the selecting of the multicast advertisement content is based on both (a) the received user-specific metadata and (b) the multicast log received from the broadcast content management system, wherein selecting multicast advertisement content comprises selecting multicast advertisement content that is associated with the same tracking number as corresponding broadcast advertisement content associated with the at least one buyer;

causing, by the streaming content management system, insertion of the selected multicast advertisement content in the one or more multicasts, such that the selected multicast advertisement content is displayed on first one or more viewer devices concurrently with broadcast advertisement content being displayed on second one or more other devices; and tracking, by the broadcast content management system, advertisement content across multiple platforms using the same tracking number.

30. A system to provide content to a plurality of consumers, the system comprising:

a broadcast content management system (BCMS) that comprises at least one BCMS nontransitory processor-readable storage medium that stores at least one of processor-executable instructions or data, and at least one BCMS processor communicatively coupled to the at least one BCMS nontransitory processor-readable storage medium, in operation, the at least one BCMS processor:

generates a multicast log, the multicast log comprising at least a playlist that identifies broadcast content to be broadcast over a defined future time period, the broadcast content comprising program content interspersed with advertisement content, wherein for each of at least some of the broadcast advertisement content, the playlist includes a tracking number associated with the broadcast advertisement content that is provided by a buyer of the broadcast advertisement content; and sends the generated multicast log to a streaming content management system; and a streaming content management system (SCMS) that comprises at least one SCMS nontransitory processor-readable storage medium that stores at least one of processor-executable instructions or data, and at least one SCMS processor communicatively coupled to the at least one SCMS nontransitory processor-readable storage medium, in operation, the at least one SCMS processor:

causes one or more multicasts to be provided to one or more video player systems, the one or more multicasts comprising at least some of the broadcast content in the playlist, the one or more multicasts being provided concurrently with a broadcast;

receives a request for advertisement content, the request for advertisement content including user-specific metadata that is associated with a user of a video player system;

responsive to receiving the request for advertisement content, selects multicast advertisement content associated with at least one buyer, wherein the selecting of the multicast advertisement content is based on both (a) the received user-specific metadata and (b) the multicast log received from the broadcast content management system, wherein the at least one SCMS processor selects multicast advertisement content that is associated with the same tracking number as corresponding broadcast advertisement content associated with the at least one buyer;

causes insertion of the selected multicast advertisement content in the one or more multicasts, such that the selected multicast advertisement content is displayed on first one or more viewer devices concurrently with broadcast advertisement content being displayed on second one or more other devices;

provides a unified advertisement decisioning for the plurality of consumers; and re-aggregates information of the plurality of consumers based on the unified advertisement decisioning.

* * * * *